US012322322B2

(12) United States Patent
Ding et al.

(10) Patent No.: US 12,322,322 B2
(45) Date of Patent: Jun. 3, 2025

(54) SINGLE-CLOCK DISPLAY DRIVER

(71) Applicant: TEXAS INSTRUMENTS INCORPORATED, Dallas, TX (US)

(72) Inventors: Shang Ding, Shanghai (CN); Huibo Zhong, Shanghai (CN); Yang Wang, Shanghai (CN); Haibin Shao, Shanghai (CN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 17/139,544

(22) Filed: Dec. 31, 2020

(65) Prior Publication Data

US 2021/0233462 A1 Jul. 29, 2021

Related U.S. Application Data

(60) Provisional application No. 62/965,492, filed on Jan. 24, 2020.

(51) Int. Cl.
*G09G 3/36* (2006.01)
*G09G 3/32* (2016.01)

(52) U.S. Cl.
CPC ....... *G09G 3/32* (2013.01); *G09G 2310/0275* (2013.01); *G09G 2310/08* (2013.01); *G09G 2360/12* (2013.01)

(58) Field of Classification Search
CPC .......... G06F 3/0412; G06F 1/12; G06F 1/324; G06F 3/0671; G09G 3/3233; G09G 3/3406; G09G 3/32; G09G 3/3241; G09G 2320/0233; G09G 2320/0673; G09G 2320/0247; G09G 2320/064;
(Continued)

(56) References Cited

U.S. PATENT DOCUMENTS 6,606,715 B1 * 8/2003 Kikuchi .............. G06F 11/1004 714/18
7,064,738 B2 * 6/2006 Igarashi ................ G09G 5/008 345/98
(Continued)

FOREIGN PATENT DOCUMENTS

CN 102184696 B 10/2014
CN 109920366 B 4/2021
(Continued)

OTHER PUBLICATIONS

OA1 Search report, Oct. 14, 2024.

*Primary Examiner* — Benjamin X Casarez
(74) *Attorney, Agent, or Firm* — Valerie M. Davis; Frank D. Cimino

(57) ABSTRACT

Aspects of the description provide for a circuit. In at least some examples, the circuit includes a driver. The driver includes a phase-locked loop and a digital interface. The phase-locked loop is configured to receive a clock signal and provide a second clock signal based on the first clock signal. The digital interface is configured to, receive the first clock signal, receive and sample data from a data frame at sequential rising edge transitions and falling edge transitions of the first clock signal, extract a portion of the data frame addressed to the driver from the data frame, and provide a portion of the data frame remaining after extracting the portion of the data frame addressed to the driver.

19 Claims, 5 Drawing Sheets

(58) Field of Classification Search
CPC ..... G09G 2320/0271; G09G 2320/045; G09G 2320/0646; G09G 2310/0275; G09G 2310/0294; G09G 2330/06; G09G 2340/0428; G09G 3/2011; G09G 3/3275; G09G 3/34; G09G 5/006; G09G 2370/08; G09G 2310/027; G09G 2310/08; G09G 2360/12; G11C 7/22; G11C 11/4076; G11C 11/4096; G11C 7/1072; G11C 7/1093; G11C 16/32
See application file for complete search history.

(56) References Cited

U.S. PATENT DOCUMENTS

| | | | | |
|---|---|---|---|---|
| 2002/0140662 | A1 | 10/2002 | Igarashi | |
| 2002/0180719 | A1* | 12/2002 | Nagai | G09G 3/32 345/206 |
| 2003/0043126 | A1* | 3/2003 | Fujino | G09G 3/3688 345/204 |
| 2004/0222949 | A1* | 11/2004 | Kim | G09G 3/2022 345/60 |
| 2007/0257923 | A1* | 11/2007 | Whitby-Strevens | G09G 5/006 370/254 |
| 2011/0199369 | A1* | 8/2011 | Huang | G09G 3/20 345/213 |
| 2012/0081349 | A1* | 4/2012 | Tomita | G09G 3/3685 345/211 |
| 2012/0133661 | A1* | 5/2012 | Lee | G09G 3/3688 345/204 |
| 2015/0279267 | A1* | 10/2015 | Tien | H05B 45/325 345/82 |
| 2016/0125845 | A1* | 5/2016 | Oh | G09G 3/3666 345/214 |
| 2018/0322087 | A1* | 11/2018 | Lund | G06F 9/542 |
| 2019/0295457 | A1* | 9/2019 | Li | G09G 3/32 |
| 2021/0150976 | A1* | 5/2021 | Wei | G09G 3/32 |
| 2021/0358450 | A1* | 11/2021 | Lo | G09G 5/008 |

FOREIGN PATENT DOCUMENTS

| | | | | |
|---|---|---|---|---|
| CN | 110546614 B | | 9/2023 | |
| KR | 20170071717 A | * | 6/2017 | G09G 3/3866 |

* cited by examiner

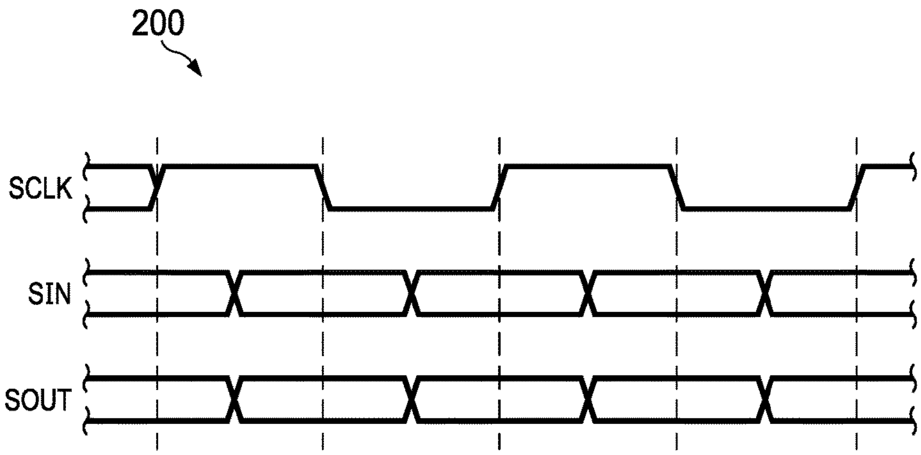
FIG. 2
300
| SCLK \ GCLK | 40 MHz | 80 MHz | 120 MHz | 160 MHz | 180 MHz |
|---|---|---|---|---|---|
| 5 MHz | x8 | x16 | x24 | x32 | x36 |
| 10 MHz | x4 | x8 | x12 | x16 | x18 |
| 20 MHz | x2 | x4 | x6 | x8 | x9 |
FIG. 3
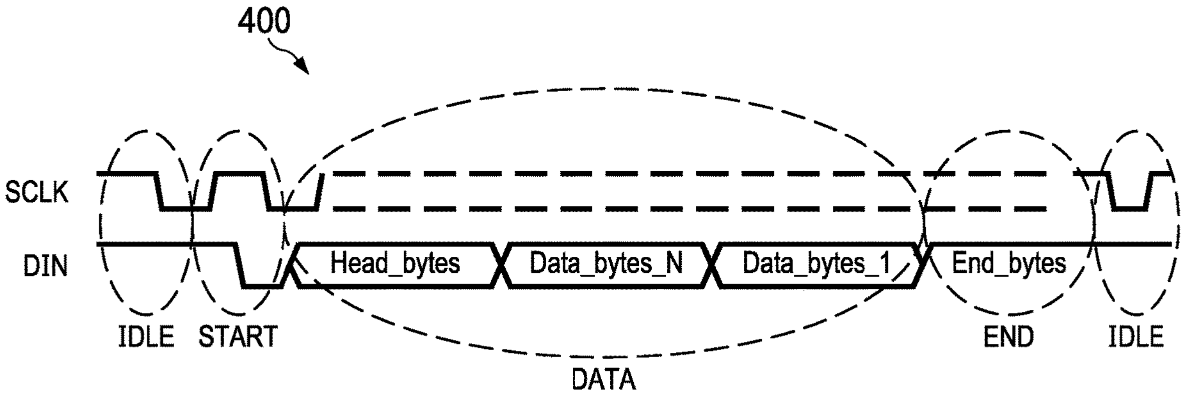
FIG. 4

SINGLE-CLOCK DISPLAY DRIVER

CROSS-REFERENCE TO RELATED APPLICATION

This application claims priority to U.S. Provisional Patent Application No. 62/965,492, filed Jan. 24, 2020, which is hereby incorporated herein by reference in its entirety.

BACKGROUND

Some visual displays include multiple light emitting diodes (LEDs) arranged in groups (such as a grouping of red, green, and blue LEDs) that are then formed into panels or arrays of many LEDs. The LED panels are often controlled by a controller transmitting signals to drivers that drive the LEDs and cause them to emit light, or not emit light, in certain sequences. This control causes the LED panels to emit a visual display, such as colors, patterns, images, etc. As increasingly demanding display performance criteria are placed on the LED panels, challenges can arise in controlling or driving the LED panels.

SUMMARY

In at least some examples, a circuit includes a driver. The driver includes a phase-locked loop and a digital interface. The phase-locked loop is configured to receive a first clock signal and provide a second clock signal based on the first clock signal. The digital interface is configured to, receive the first clock signal, receive and sample data from a data frame at sequential rising edge transitions and falling edge transitions of the first clock signal, extract a portion of the data frame addressed to the driver from the data frame, and provide a portion of the data frame remaining after extracting the portion of the data frame addressed to the driver.

In at least some examples, a circuit includes a driver. The driver includes a phase-locked loop and a digital interface. The phase-locked loop is configured to receive first clock signal and provide second clock signal based on the first clock signal. The digital interface is configured to receive the first clock signal, receive a data frame, write data to the data frame at sequential rising edge transitions and falling edge transitions of the first clock signal, and provide the data frame after writing to the data frame.

In at least some examples, a system includes a display, a display controller, and a first driver. The display includes a portion arranged into multiple rows and multiple columns. The display controller is configured to control the rows of the display, provide a data frame to the first driver of a daisy chain of drivers, and provide first clock signal to each driver of the daisy chain of drivers. The first driver is configured to provide second clock signal based on the first clock signal, receive the data frame from the display controller, remove a portion of the data frame addressed to the first driver from the data frame, provide a remainder of the data frame to a next driver in the daisy chain of drivers, and control the first portion of the display according to the portion of the data frame addressed to the first driver and the second clock signal.

BRIEF DESCRIPTION OF THE DRAWINGS

FIG. 2 is a diagram of example signal waveforms.

FIG. 3 is a table of clock signal frequency relations.

FIG. 4 is a diagram of an example data frame.

DETAILED DESCRIPTION

Figure 1:
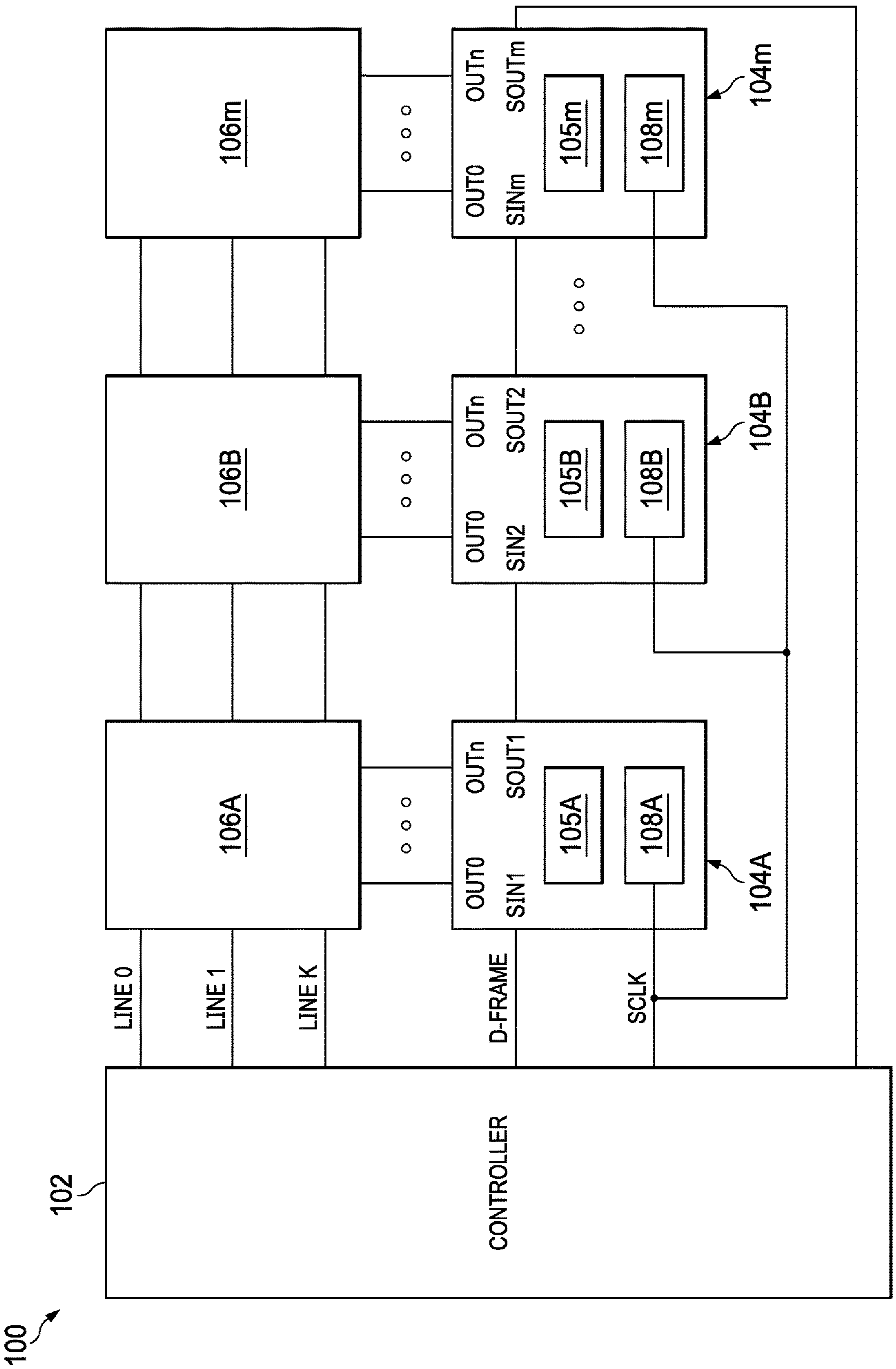
FIG. 1 is a block diagram of an example display system.

Modern visual displays are generally trending toward increased display performance criteria such as frame rate and contrast ratio, among other criteria. For example, where an image frame rate of 60 hertz (Hz) may have been considered acceptable display performance in the past, increased frame rates such as about 120 Hz may be considered by some to be acceptable display performance currently. Even higher frame rates may become what are considered acceptable display performance in the future. Similarly, a contrast ratio of about 25000 to 1 (25000:1) may be considered by some to be acceptable display performance currently. Even higher contrast ratios may become what are considered acceptable display performance in the future. As used herein, a contrast ratio is a difference between a brightest image a visual display can create and a darkest image the visual display can create. Described in another way, the contrast ratio may be considered to be a ratio formed by dividing a highest brightness displayable by the visual display by a lowest brightness displayable by the visual display. The acceptable display performance is at least sometimes driven by consumer preference such that certain values for display performance criteria may be considered customer or consumer product selection criteria or "care abouts." For example, a customer or consumer seeking to select or purchase a visual display may decline to select or purchase a visual display that has a frame rate of less than 120 Hz, and instead will select or purchase a different visual display that has a frame rate of 120 Hz. Similar selection or purchase criteria can be applied to contrast ratio and other various display performance criteria.

Challenges can arise in creating controllers or drivers for controlling visual displays with these increased display performance criteria. For example, at least some drivers receive and operate according to both a data shift clock (SCLK) and a grayscale clock (GCLK). The SCLK is, in some examples, utilized by a driver in relation to data transfer (receipt and/or transmission) and the GCLK is utilized by the driver in relation to grayscale display. For example, a driver provides a pulse-width modulation (PWM) based on received control data and GCLK to control a brightness of a visual display (e.g., such as one or more LEDs) under control of the driver. As the frame rate of a visual display increases, a speed with which data is provided to the visual display to facilitate that increased frame rate also increases. To accommodate the increased speed of data transmission, in at least some conventional driver implementations SCLK also increases in frequency. Similarly, as a contrast ratio increases, a resolution of data (e.g., a number of data bits) received by the drivers for controlling the visual display also increases. As the resolution of data increases, in at least some conventional driver implementations GCLK also increases in frequency. With increases in frequency of SCLK and/or GCLK, additional challenges can arise. For example, many drivers and/or visual displays are subject to emissions standards, such as a radiated emissions test. A radiated emissions test measures an electromagnetic field strength for electromagnetic emissions of a device that are unintentionally provided by the device (e.g., provided as a result of operation of the device and not as a planned or intentional feature or function of the device). As SCLK and GCLK increase in frequency, so too can noise in a device and correspondingly electromagnetic emissions of the device. In a device in which SCLK and GCLK are increased to frequencies sufficient for supporting 120 Hz or greater frame rates and 25000:1 or greater contrast ratios, in at least some examples the electromagnetic emissions of the device exceed permitted standards or specifications. Accordingly, challenges can arise in supporting 120 Hz or greater frame rates and/or 25000:1 or greater contrast ratios without increasing SCLK and GCLK to frequencies that cause electromagnetic emissions of the device to exceed the permitted standards or specifications.

A driver according to this description is, in some examples, capable of supporting a frame rate of 120 Hz and a contrast ratio of 25000:1. The driver, in at least some implementations, receives SCLK and internally provides GCLK, based on SCLK, via a clock divider or scaler. In at least some examples, the clock divider is implemented as a phase-locked loop (PLL) circuit, such as a PLL frequency synthesizer that provides GCLK as a multiple of SCLK. In at least some implementations, the driver of this description also samples received input data at both rising edges and falling edges of SCLK. Sampling the input data at both rising and falling edges of SCLK, in at least some examples, enables the driver to support the 120 Hz frame rate with an SCLK frequency the same or lesser in value than an SCLK frequency for a frame rate of 60 Hz. In at least some examples, enabling support for the 120 Hz frame rate at an SCLK frequency suitable for supporting the 60 Hz frame rate prevents or mitigates the creation of additional signal noise and/or electromagnetic emissions that may cause electromagnetic emissions of the driver to exceed applicable standards or specifications. Further, in at least some examples the driver generating GCLK internally via a PLL circuit, based on SCLK, reduces electromagnetic (EM) emissions in a system including the driver because a high frequency GCLK signal does not flow through wires, traces, or other interconnects between components of the system.

Because SCLK is a source for generating GCLK, SCLK is continuous such that the driver continues to receive SCLK whether data is being received or not. Challenges can therefore arise in identifying IDLE, START, DATA, and/or END states of the input data and supporting multi-device cascading between, or among, multiple drivers. Accordingly, at least some aspects of this description also provide for a communication protocol for supporting multi-device cascading between, or among, multiple drivers in a system with a continuous SCLK.

FIG. 1 is a block diagram of an example display system 100. The display system 100, in at least some examples, is representative of any display system irrespective of format (e.g., large or small) that includes LEDs driven by a driver under the control of a controller. For example, the display system 100 may be representative of a consumer device such as a smart phone, a smart watch, a tablet device, a laptop device, a computer monitor, a television, an automobile display or displays, or any other consumer or enterprise product or device with a display screen that utilizes LEDs. The display system 100 may further be representative of a monitor in a transportation device, a modular LED display or large format screen (e.g., such as stadium or arena displays), etc.

In at least one implementation, the display system 100 includes a controller 102, drivers 104A, 104B, 104*m*, and LED arrays 106A, 106B, 106*m*, where m is any suitable integer value. The LED arrays 106A, 106B, 106*m* each include multiple LEDs arranged in k scan lines (e.g., horizontal rows) and n channels (e.g., vertical columns). Each driver 104A, 104B, 104*m* includes n outputs, where each output is uniquely coupled to a channel of a corresponding LED array. The controller 102, the drivers 104A, 104B, 104*m*, and the LED arrays 106A, 106B, 106*m* are, in some examples, arranged to form a time-multiplexing circuit or system. For example, the controller 102 is coupled to each of the LED arrays 106A, 106B, 106*m* to control the k scan lines of the LED arrays 106A, 106B, 106*m*. The controller 102 is further coupled to each of the drivers 104A, 104B, 104*m* to provide a data frame (D_FRAME) to the driver 104A as a data input (SIN), provide the drivers 104A, 104B, 104*m* with SCLK, and receive a data output (SOUT) of the driver 104*m*. The driver 104A is coupled to the driver 104B to provide a data output of the driver 104A to the driver 104B as a data input of the driver 104B. The driver 104B is coupled to the driver 104*m* to provide a data output of the driver 104B to the driver 104*m* as a data input of the driver 104*m*. Each of the drivers 104A, 104B, 104*m* also includes a PLL 108A, 108B, 108*m*, respectively, that provides GCLK according to SCLK for internal use by the respective drivers 104A, 104B, 104*m*. In various examples, the controller 102 takes any suitable form. For example, in some implementations the controller 102 is a field programmable gate array (FPGA). In other examples, the controller 102 is a processor, a micro-processor, a micro-controller, an application-specific integrated circuit (ASIC), or any other suitable structure capable of exerting control over the drivers 104A, 104B, 104*m*. In various examples, the PLLs 108A, 108B, 108*m* each take any form or architecture suitable for performing at least the actions ascribed thereto in this description. Also, while the drivers 104A, 104B, 104*m* are shown and described as including the PLLs 108A, 108B, 108*m*, respectively, in various examples the drivers 104A, 104B, 104*m* include any other suitable circuitry or components, such as digital interfaces 105A, 105B, 105*m*, or a processing component, a signal generator such as a PWM signal generator, etc. Accordingly, actions ascribed to a respective driver 104A, 104B, 104*m* herein may be implemented or performed by a respective digital interface 105A, 105B, 105*m* configured to perform such actions.

In an example of operation of the display system 100, the controller 102 controls each of the scan lines of the LED arrays 106A, 106B, 106*m* to control delivery of power to each scan line of the of the LED arrays 106A, 106B, 106*m*. The controller 102 also provides SCLK to each of the drivers 104A 104B, 104*m*. To write data to one or more of the drivers 104A 104B, 104*m*, the controller 102 provides D_FRAME containing one or more commands and one or more data bytes to the driver 104A, which receives D_FRAME as SIN1. In at least some examples, D_FRAME, as provided by the controller 102, includes data for one or more of the drivers 104A, 104B, 104*m*. After the driver 104A receives D_FRAME, the driver 104A removes a portion of D_FRAME designated for the driver 104A and forwards a remainder of D_FRAME C as SOUT1 to the driver 104B as SIN2. After the driver 104B receives SIN2, the driver 104B removes a portion of D_FRAME designated for the driver 104B and forwards a remainder of D_FRAME as SOUT2 to the driver 104*m* as SINm. After the driver 104*m* receives SINm, the driver 104*m* removes a portion of D_FRAME designated for the driver 104*m*.

To read data from the one or more of the drivers 104A, 104B, 104*m*, the controller 102 provides D_FRAME containing one or more commands to the driver 104A, which receives D_FRAME as SIN1. In at least some examples, the commands instruct one or more of the drivers 104A 104B 104*m* to write data to D_FRAME. After the driver 104A receives D_FRAME, the driver 104A adds a data byte containing output data of the driver 104A to D_FRAME and forwards D_FRAME as SOUT1 to the driver 104B as SIN2. After the driver 104B receives SIN2, the driver 104B adds a data byte containing output data of the driver 104B to D_FRAME and forwards D_FRAME as SOUT2 to the driver 104*m* as SINm. After the driver 104*m* receives SINm, the driver 104*m* adds a data byte containing output data of the driver 104*m* to D_FRAME and forwards D_FRAME to the controller 102 as return data.

In at least some examples, the drivers 104A, 104B, 104*m* read from D_FRAME and/or write to D_FRAME at each of a rising edge of SCLK and a falling edge of SCLK. By reading from D_FRAME and/or writing to D_FRAME at both rising and falling edges of SCLK (e.g., dual-edge reading and/or writing), the drivers 104A, 104B, 104*m* effectively operate at approximately double a frequency of SCLK. The drivers 104A, 104B, 104*m* do so without generating amounts of electromagnetic emissions conventionally associated with single-edge systems that operate according to a received clock signal that has a frequency of approximately double the frequency of SCLK as received by the drivers 104A, 104B, 104*m*.

In at least some examples, SCLK in a dual-edge system has a frequency greater than or equal to a result of the following equation 1 in which k, m, and n are as described above, d is a number of data bits for use in controlling the LED arrays 106A, 106B, 106*m* (e.g., a width of the data), r is a ratio of the effective data transmitting time for one data frame in the display system 100, and R is a frame rate for the display system 100.

$$\frac{R * \frac{d \times k \times (m \times n)}{r}}{2}$$

Similarly, a frequency of GCLK, provided internally in the drivers 104A, 104B, 104*m* by the PLL 108A, 108B, 108*m*, respectively, has a frequency greater than or equal to a result of the following equation 2 in which k, q is a ratio of the effective display time for one data frame in the display system 100, R is as described above, and y is a resolution of each output channel of the drivers 104A 104B 104*m*.

$$\left(R * \frac{2^y \times k}{q}\right)$$

FIG. 2 is an example waveform diagram 200. The diagram 200 shows a timing sequence of communication in a display system, such as the display system 100 of FIG. 1. The diagram 200 shows SCLK SIN for one of the drivers 104A 104B 104*m* and SOUT for one of the drivers 104A 104B, 104*m*. The diagram 200 represents time in a horizontal direction and each signal of the diagram 200 shows a logical asserted value and a logical de-asserted value in a vertical direction.

As shown in FIG. 2, SIN and SOUT transition between asserted and de-asserted states or values fully within an on-time, or an off-time, of SCLK. In this way, SIN and SOUT values are stable at both rising and falling edges of SCLK. Because SIN is stable at both rising and falling edges of SCLK, SIN is suitable for reading (e.g., sampling) at both the rising and falling edges of SCLK. Similarly, because SOUT is stable at both rising and falling edges of SCLK, SOUT is suitable for shifting or providing to a next device (e.g., a next cascaded driver of the drivers 104A, 104B, 104*m* or the controller 102) at both the rising and falling edges of SCLK. Sampling or providing data output at both the rising and falling edges of SCLK, as described above, enables operation of the drivers 104A, 104B, 104*m* at a frequency greater than a frequency of SCLK. This prevents the drivers 104A, 104B, 104*m* from generating electromagnetic emissions normally associated with a frequency of operation of the drivers 104A, 104B, 104*m* if the drivers 104A, 104B, 104*m* were sampling and providing data as output at only a single edge of SCLK.

FIG. 3 is a table 300 relating example SCLK to GCLK values. As described above, a driver, such as the drivers 104A, 104B, 104*m* of the display system 100 of FIG. 1 each include a clock divider, such as the PLLs 108A, 108B, 108*m*, respectively. In the table 300, columns correspond to frequencies of GCLK, rows correspond to frequencies of SCLK, and intersection points between the columns and rows correspond to scaling values for SCLK to obtain a corresponding GCLK. The PLLs 108A, 108B, 108*m* apply the scaling value to SCLK to provide GCLK within each driver 104A, 14B, 104*m*, respectively. While certain frequencies of SCLK and GCLK are shown in the table 300, these are merely examples and the relations and principles shown and described with respect to the table 300 apply to any other suitable frequencies for SCLK and GCLK.

FIG. 4 is a diagram 400 of an example data frame. The diagram 400 shows SCLK and D_FRAME, each as described above. The diagram 400 is further separated into four states of data communication—IDLE, START, DATA, and END. During the IDLE state, an asserted value (e.g., a logical high or "1" value) is maintained. During the IDLE state, meaningful data is not being communicated as D_FRAME. Following the IDLE state, D_FRAME begins with the START state in which a value of D_FRAME is inverted to a de-asserted value (e.g., a logical low or "0" value). Following the START state, the DATA state begins.

During the DATA state, in at least some examples, D_FRAME includes at least one Head_bytes and one or more Data_bytes. For example, in at least one implementation, during the DATA state, D_FRAME includes a Head_bytes followed by Data_byte 1, Data_byte_2, Data_byte_N, where N is any suitable integer value. The Head_bytes, in at least some examples, includes 16 bits of data followed by a check bit, where the 16 bits of data indicate one or more commands. The command(s) may be instructions to one or more of the drivers 104A, 104B, 104*m* to perform actions such as output data or modify a control signal for controlling one of the LED arrays 106A, 106B, 106*m*, respectively. Each Data_byte, in at least some examples, also includes 16 bits of data followed by a check bit. In at least some examples, the check bit of both the Head_bytes and the Data_bytes is a logical inversion of an immediately preceding bit (e.g., a logical inversion or NOT function applied to a 16th bit of data of the respective Head_bytes or Data_byte).

In some examples, D_FRAME includes more Data_bytes than a number of the drivers 104A, 104B, 104*m*. In other examples, D_FRAME includes fewer Data_bytes than a number of the drivers 104A, 104B, 104*m*. In yet other examples, D_FRAME includes a same number of Data_bytes as a number of the drivers 104A, 104B, 104*m*. Further, as described above with respect to FIG. 1 and further described below in this description, a number of Data_bytes in D_FRAME can increase or decrease as D_FRAME is communicated between, or among, the drivers 104A, 104B, 104*m* and the controller 102.

Following the DATA state, the END state begins. The END state includes an asserted value for 18 continuous clock cycles (e.g., 9 rising edges of SCLK and 9 falling edges of SCLK). In at least one example this means that the END state includes 18 consecutive logical high or "1" value data bits.

While certain numbers of bits have been described with respect to FIG. 4, in various examples other number of bits is also acceptable and encompassed within the scope of this description. For example, the Head_bytes may include more, or fewer, than 16 bits and the Data_bytes may include more or fewer than 16 bits. Further, the START state may be indicated by any other suitable pattern of any chosen number of bits. The END state may include any other suitable pattern of any chosen number of bits.

Figure 5:
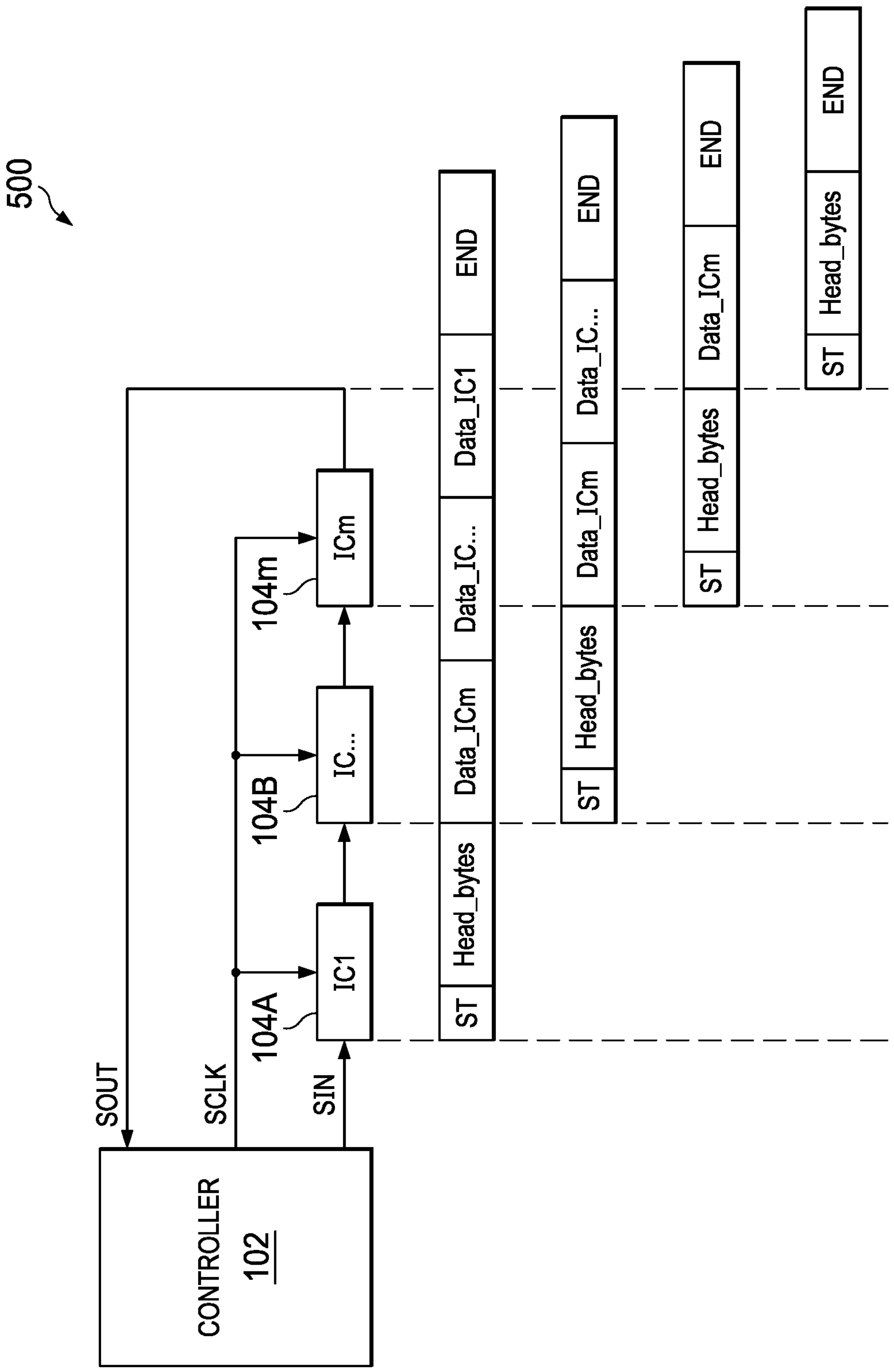
FIG. 5 is a diagram of an example data write sequence.

FIG. 5 is a diagram 500 of an example data write sequence. In at least some examples, the data write sequence is representative of communication from a controller, such as the controller 102 of FIG. 1 to a driver, such as the driver 104A of FIG. 1 and then between drivers such as the drivers 104A 104B, 104*m* of FIG. 1.

As described above with respect to FIG. 4, D_FRAME includes one or more Data_bytes. For the purposes of explanation, D_FRAME is shown in FIG. 5 as being provided by the controller 102 having m Data_bytes, each uniquely corresponding to one of the drivers 104A, 104B, 104*m*.

In at least one example, to write data to one or more of the drivers 104A, 104B, 104*m*, the controller 102 provides D_FRAME to the driver 104A. The driver 104A receives D_FRAME, reads any commands or instructions in the Head_bytes of D_FRAME, and removes a specified amount of data from D_FRAME, subject to the instructions in the Head_bytes. In some examples, that predefined amount of data is predetermined, such as a first X bits following a last bit of the Head_bytes, a last X bits in D_FRAME before a beginning of the END indicator, or X bits beginning at some other designated position of D_FRAME In other examples, the data to be removed by each of the drivers 104A, 104B, 104*m* is specified according to any suitable process or indicator. After one of the drivers 104A, 104B, 104*m* removes data from D_FRAME, a remainder of D_FRAME is forwarded to a next downstream cascaded device and the above process of receipt of, and removal of data from, D_FRAME repeats until no further Data_bytes remain in D_FRAME.

While the above description of FIG. 5 is premised on the controller 102 transmitting D_FRAME to the driver 104A, in other implementations the controller 102 instead transmits D_FRAME to the driver 104*m*. In such examples, actions ascribed above to the driver 104A are instead performed by the driver 104*m* and actions ascribed above to the driver 104*m* are instead performed by the driver 104A.

Figure 6:
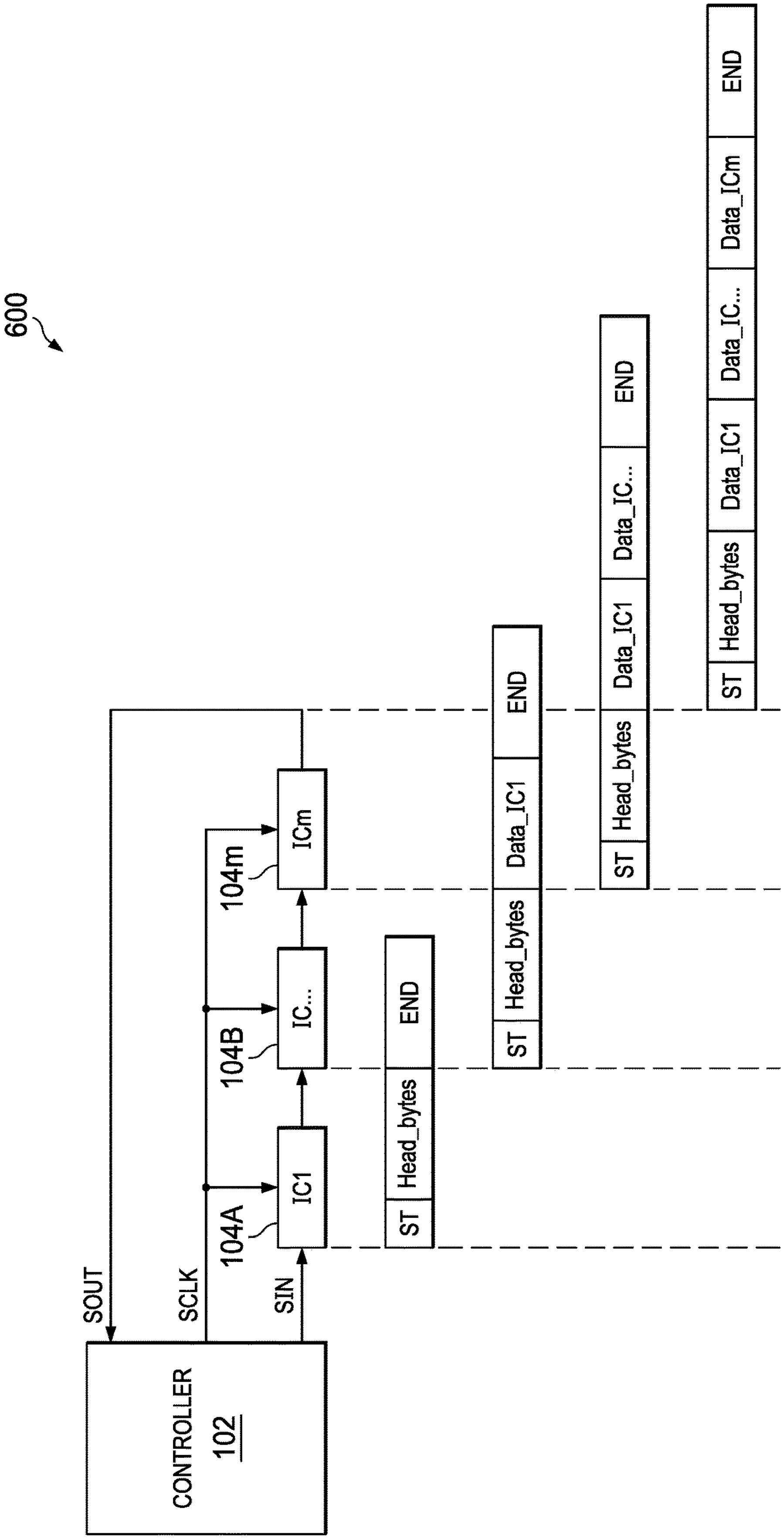
FIG. 6 is a diagram of an example data read sequence.

FIG. 6 is a diagram 600 of an example data read sequence. In at least some examples, the data read sequence is representative of communication between, and among, drivers, such as the drivers 104A 104B, 104*m* of FIG. 1 to a controller, such as the controller 102 of FIG. 1.

As described above with respect to FIG. 4, D_FRAME includes one or more Data_bytes. For the purposes of explanation, D_FRAME is shown in FIG. 6 as being received by the controller 102 having m Data_bytes, each uniquely corresponding to one of the drivers 104A, 104B, 104*m*.

In at least one example, to read data from one or more of the drivers 104A, 104B, 104*m*, the controller 102 provides D_FRAME to the driver 104A having a Head_bytes instructing at least some of the drivers 104A, 104B, 104*m* to write Data_bytes to D_FRAME The driver 104A receives D_FRAME, reads any commands or instructions in the Head_bytes of D_FRAME, and writes a specified amount of data to D_FRAME as a Data_byte, subject to the instructions in the Head_bytes. In some examples, that predefined amount of data is predetermined, such as a first X bits following a last bit of the Head_bytes, a last X bits preceding a beginning of the END indicator, or X bits beginning at some other designated position of D_FRAME In other examples, the data to be written by each of the drivers 104A, 104B, 104*m* is specified according to any suitable process or indicator. After one of the drivers 104A, 104B, 104*m* writes data to D_FRAME, D_FRAME is forwarded to a next downstream cascaded device and the above process of receipt of, and writing of data to, D_FRAME repeats until D_FRAME is provided by the driver 104*m* to the controller 102.

While the above description of FIG. 6 is premised on the controller 102 transmitting D_FRAME to the driver 104A, in other implementations the controller 102 instead transmits D_FRAME to the driver 104*m*. In such examples, actions ascribed above to the driver 104A are instead performed by the driver 104*m* and actions ascribed above to the driver 104*m* are instead performed by the driver 104A.

Figure 7:
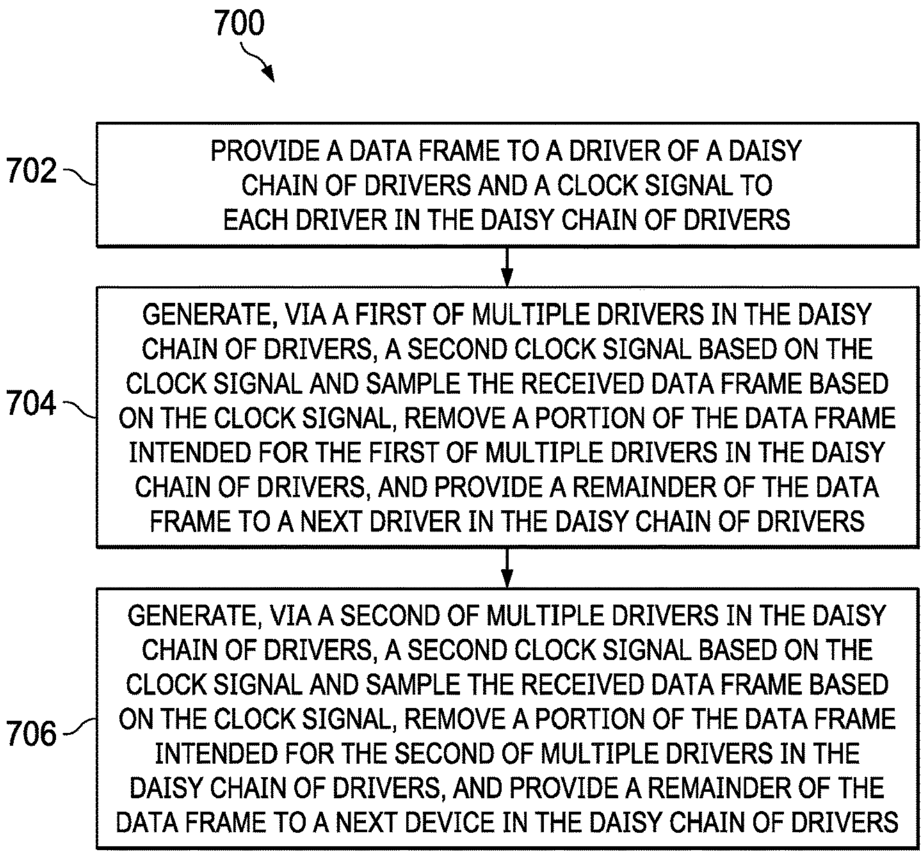
FIG. 7 is a flowchart of an example method.

FIG. 7 is a flowchart of an example method 700. The method 700 is an example of a display control method that writes data from a display controller to multiple drivers. In at least some examples, the method 700 is implemented in a system such as the display system 100 of FIG. 1. Accordingly, reference may be made in describing the method 700 to components and/or signals described above with respect to any of the figures described herein.

At operation 702, the display controller provides a data frame to a driver of a daisy chain of drivers and a clock signal to each driver in the daisy chain of drivers. In some examples, the data frame is D_FRAME and the clock is SCLK. As described above, in some implementations D_FRAME includes an indicator of a START state, Head_Bytes, a check bit, an END indicator, and one or more Data_bytes. The data frame, in at least some examples, includes Data_bytes for multiple drivers. The display controller transmits the data frame to a first of multiple drivers in the daisy chain of drivers.

At operation 704, the first of the multiple drivers provides a second clock signal based on the clock signal and samples the received data frame based on the clock signal. In at least some examples, the second clock signal is GCLK, as described elsewhere herein, and the first of the multiple drivers provides the second clock signal by processing the clock signal with a PLL. In at least some implementations, the first of the multiple drivers samples the data frame at both rising and falling edges of the clock signal. The first of the multiple drivers removes a portion of the Data_bytes of the data frame that are addressed to, or otherwise designated for, the first of the multiple drivers and then provides a remainder of the data frame to a next driver (e.g., a second driver) of the multiple drivers in the daisy chain of drivers.

At operation 706, the second driver of the multiple drivers provides a second clock signal based on the clock signal and samples the received data frame based on the clock signal. In at least some examples, the second clock signal is GCLK, as described elsewhere herein, and the second driver of the multiple drivers provides the second clock signal by processing the clock signal with a PLL. In at least some implementations, the second driver of the multiple drivers samples the data frame at both rising and falling edges of the clock signal. The second driver of the multiple drivers removes a portion of the Data_bytes of the data frame that are addressed to, or otherwise designated for, the second driver of the multiple drivers. If the second driver of the multiple drivers is the last driver in the daisy chain of drivers, the second driver of the multiple drivers provides a remainder of the data frame to the display controller. If the second driver of the multiple drivers is not the last driver in the daisy chain of drivers, the second driver of the multiple drivers provides a remainder of the data frame to a next driver (e.g., a third driver) of the multiple drivers in the daisy chain of drivers. The above operation 706 repeats for each driver in the daisy chain of drivers after the first driver of the multiple drivers in the daisy chain of drivers until a next hop in the daisy chain is a return to the display controller.

Figure 8:
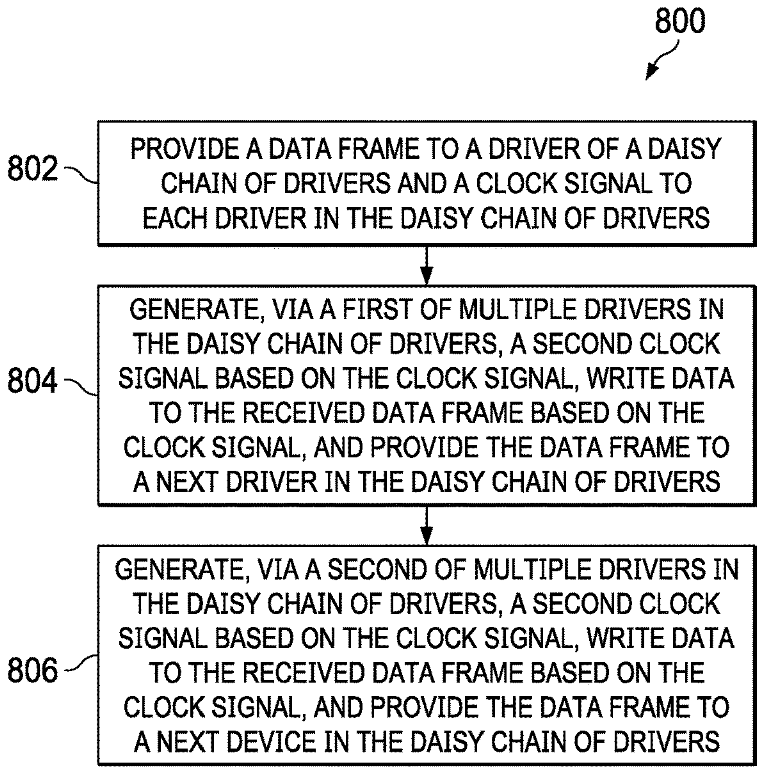
FIG. 8 is a flowchart of an example method.

FIG. 8 is a flowchart of an example method 800. The method 800 is an example of a display control method in which a display controller reads data from multiple drivers. In at least some examples, the method 800 is implemented in a system such as the display system 100 of FIG. 1. Accordingly, reference may be made in describing the method 800 to components and/or signals described above with respect to any of the figures described herein.

At operation 802, the display controller provides a data frame to a driver of a daisy chain of drivers and a clock signal to each driver in the daisy chain of drivers. In some examples, the data frame is D_FRAME and the clock is SCLK. As described above, in some implementations D_FRAME includes an indicator of a START state, Head_Bytes, a check bit, and an END indicator. The display controller transmits the data frame to a first of the multiple drivers that is in a daisy chain of drivers.

At operation 804, the first of the multiple drivers provides a second clock signal based on the clock signal and writes data to the received data frame based on the clock signal. In at least some examples, the second clock signal is GCLK, as described elsewhere herein, and the first of the multiple drivers provides the second clock signal by processing the clock signal with a PLL. In at least some implementations, the first of the multiple drivers writes data to the data frame at both rising and falling edges of the clock signal. The data written to the data frame by the first of the multiple drivers is, in some examples, output data of the first of the multiple drivers. After writing the data to the data frame, the first of the multiple drivers transmits the data frame to a next driver (e.g., a second driver) of the multiple drivers in the daisy chain of drivers.

At operation 806, the second driver of the multiple drivers provides a second clock signal based on the clock signal and writes data to the received data frame based on the clock signal. In at least some examples, the second clock signal is GCLK, as described elsewhere herein, and the second driver of the multiple drivers provides the second clock signal by processing the clock signal with a PLL. In at least some implementations, the second driver of the multiple drivers writes data to the data frame at both rising and falling edges of the clock signal. The data written to the data frame by the second of the multiple drivers is, in some examples, output data of the second of the multiple drivers. If the second driver of the multiple drivers is the last driver in the daisy chain of drivers, the second driver of the multiple drivers transmits the data frame to the display controller after writing the data to the data frame. If the second driver of the multiple drivers is not the last driver in the daisy chain of drivers, the second driver of the multiple drivers transmits the data frame to a next driver (e.g., a third driver) of the multiple drivers in the daisy chain of drivers. The above operation 806 repeats for each driver in the daisy chain of drivers after the first driver of the multiple drivers in the daisy chain of drivers until a next hop in the daisy chain is a return to the display controller.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitor, respectively, coupled in parallel between the same nodes. For example, a resistor or capacitor shown and described herein as a single component may instead be multiple resistors or capacitor, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims. Modifications are possible in the described examples, and other examples are possible within the scope of the claims.

The invention claimed is:

1. A circuit, comprising:
a driver having a clock input, a data input and a data output, the driver, including:
a phase-locked loop configured to: receive a first clock signal from the clock input; and
provide a second clock signal based on the first clock signal, wherein the first clock signal is based on a frame rate, a ratio of transmitting time for one data frame, and a number of data bits, and wherein the second clock signal is based on the frame rate and a ratio of a display time for one data frame; and
a digital interface configured to:
receive the first clock signal from the clock input;
receive a data frame from the data input, at sequential rising and falling edge transitions of the first clock signal;
extract a portion of the data frame addressed to the driver; and
after extracting the portion of the data frame addressed to the driver, provide a remaining portion of the data frame to the data output;
wherein:
the data frame includes a start indicator, head bytes, a check bit, data bytes, and an end indicator; and
the digital interface is configured to operate in:
an idle state in response to the data frame having a first logical high value;
a start state subsequent to the idle state and in response to the data frame inverting from the first logical high value to a logical low value;
a data state subsequent to the start state; and
an end state subsequent to the data state and in response to a second logical high value for a plurality of continuous cycles of the first clock signal.

2. The circuit of claim 1, wherein the driver is a first driver, the circuit further comprises a second driver, and the data bytes include: the portion of the data frame addressed to the first driver; and a portion of the data frame addressed to the second driver.

3. The circuit of claim 2, wherein the clock input is a first clock input, the data input is a first data input, the data output is a first data output, the phase-locked loop is a first phase-locked loop, the digital interface is a first digital interface, the remaining portion is a first remaining portion, the second driver has a second clock input, a second data input and a second data output, the second clock input is coupled to the first clock input, the second data input is coupled to the first data output, and the second driver includes:
a second phase-locked loop configured to: receive the first clock signal from the second clock input; and provide an other instance of the second clock signal based on the first clock signal; and
a second digital interface configured to:
receive the first clock signal from the second clock input;
receive the remaining portion of the data frame from the second data input, at sequential rising and falling edge transitions of the first clock signal;
extract a portion of the data frame addressed to the second driver; and
after extracting the portion of the data frame addressed to the second driver, provide a second remaining portion of the data frame to the second data output.

4. The circuit of claim 3, wherein the circuit further comprises a third driver having a third clock input, a third data input and a third data output, the third clock input is coupled to the first clock input, the third data input is coupled to the second data output, and the second digital interface is configured to provide the second remaining portion of the data frame to the third driver if the second remaining portion of the data frame includes a portion of the data frame addressed to the third driver.

5. The circuit of claim 4, wherein the third data output is coupled to a display controller terminal.

6. The circuit of claim 5, wherein the first driver is configured to control a first portion of a display at least partially according to the portion of the data frame addressed to the first driver and the second clock signal, and the second driver is configured to control a second portion of the display at least partially according to the portion of the data frame addressed to the second driver and the other instance of the second clock signal.

7. The circuit of claim 1, further comprising a display controller coupled to the clock input and the data input, wherein:
the display controller is configured to: control display lines; provide the first clock signal to the clock input; and provide the data frame to the data input; and
the driver is configured to control display columns at least partially according to the portion of the data frame addressed to the driver and the second clock signal.

8. The circuit of claim 1, wherein the plurality of continuous cycles is 16.

9. A circuit, comprising:
a first driver having a first clock input, a first data input and a first data output, the first driver including:
a first phase-locked loop configured to: receive a first clock signal from the first clock input; and provide a second clock signal based on the first clock signal, wherein the first clock signal is based on a frame rate, a ratio of transmitting time for one data frame, and a number of data bits, and wherein the second clock signal is based on the frame rate and a ratio of a display time for one data frame; and
a first digital interface configured to:
receive the first clock signal from the first clock input;
receive a data frame from the first data input, wherein the data frame includes a start indicator, head bytes, a check bit, data bytes, and an end indicator;
write first data to the data frame at sequential rising and falling edge transitions of the first clock signal; and
after writing the first data to the data frame, provide the data frame to the first data output; and
a second driver having a second clock input, a second data input and a second data output, in which the second clock input is coupled to the first clock input, the second data input is coupled to the first data output, and the second driver includes:
a second phase-locked loop configured to: receive the first clock signal from the second clock input; and provide an other instance of the second clock signal based on the first clock signal; and a second digital interface configured to:

receive the first clock signal from the second clock input;

receive the data frame from the second data input;

write second data to the data frame at sequential rising and falling edge transitions of the first clock signal; and after writing the second data to the data frame, provide the data frame to the second data output;

wherein: . the first digital interface is configured to operate in:

an idle state in response to the data frame having a first logical high value;

a start state subsequent to the idle state and in response to the data frame inverting from the first logical high value to a logical low value;

a data state subsequent to the start state; and an end state subsequent to the data state and in response to the end indicator having a second logical high value for a plurality of continuous cycles of the first clock signal.

10. The circuit of claim 9, further comprising:

a display controller; and a third driver coupled in a daisy chain between the second driver and the display controller.

11. The circuit of claim 9, further comprising a display controller having a third data input coupled to the second data output.

12. The circuit of claim 9, wherein the first data is based on a first display portion controlled by the first driver, and the second data is based on a second display portion controlled by the second driver.

13. The circuit of claim 9, wherein the plurality of continuous cycles is 16.

14. A system, comprising:

a daisy chain of drivers, including first and second drivers;

a display including a portion arranged into rows and columns; and a display controller coupled to the display and the first and second drivers, the display controller configured to:

control the rows of the display;

provide a data frame to the first driver, wherein the data frame includes a start indicator, head bytes, a check bit, data bytes, and an end indicator; and provide a first clock signal to each of the first and second drivers;

wherein the first driver is configured to:

provide a second clock signal based on the first clock signal, wherein the first clock signal is based on a frame rate, a ratio of transmitting time for one data frame, and a number of data bits, and wherein the second clock signal is based on the frame rate and a ratio of a display time for one data frame;

receive the data frame from the display controller;

remove a portion of the data frame addressed to the first driver;

after removing the portion of the data frame addressed to the first driver, provide a remainder of the data frame to the second driver;

control the portion of the display according to the portion of the data frame addressed to the first driver and the second clock signal; and operate in:

an idle state in response to the data frame having a first logical high value;

a start state subsequent to the idle state and in response to the data frame inverting from the first logical high value to a logical low value;

a data state subsequent to the start state; and an end state subsequent to the data state and in response to the end indicator having a second logical high value for a plurality of continuous cycles of the first clock signal.

15. The system of claim 14, wherein the remainder is a first remainder, the portion of the display is a first portion, the display includes a second portion arranged into rows and columns, the second driver has a data output, and the second driver is configured to:

provide an other instance of the second clock signal based on the first clock signal;

receive the first remainder of the data frame from the first driver;

remove a portion of the first remainder of the data frame addressed to the second driver;

after removing the portion of the first remainder of the data frame addressed to the second driver, provide a second remainder of the data frame to the data output; and control the second portion of the display according to the portion of the first remainder of the data frame addressed to the second driver and the other instance of the second clock signal.

16. The system of claim 15, wherein: the daisy chain includes a third driver having a data input coupled to the data output; or the display controller has a data input coupled to the data output.

17. The system of claim 15, wherein:

the data frame is a first data frame;

the display controller is configured to provide a second data frame to the first driver;

the first driver is configured to:

receive the second data frame from the display controller;

write first data to the second data frame; and after writing the first data to the data frame, provide the second data frame to the second driver; and the second driver is configured to:

receive the second data frame from the first driver;

write second data to the second data frame; and after writing the second data to the data frame, provide the second data frame to the data output.

18. The system of claim 17, wherein: the daisy chain includes a third driver having a data input coupled to the data output; or the display controller has a data input coupled to the data output.

19. The system of claim 14, wherein the plurality of continuous cycles is 16.

* * * * *